United States Patent
Mooney

(10) Patent No.: US 10,959,891 B1
(45) Date of Patent: Mar. 30, 2021

(54) WEIGHT SENSING PAD ASSEMBLY

(71) Applicant: Christopher Mooney, Jemez Springs, NM (US)

(72) Inventor: Christopher Mooney, Jemez Springs, NM (US)

( * ) Notice: Subject to any disclaimer, the term of this patent is extended or adjusted under 35 U.S.C. 154(b) by 0 days.

(21) Appl. No.: 16/572,840

(22) Filed: Sep. 17, 2019

(51) Int. Cl.
*A61G 1/04* (2006.01)
*G01G 19/44* (2006.01)
*G01G 23/36* (2006.01)
*G01G 19/52* (2006.01)
*G01G 3/12* (2006.01)

(52) U.S. Cl.
CPC ............... *A61G 1/04* (2013.01); *G01G 3/12* (2013.01); *G01G 19/445* (2013.01); *G01G 19/52* (2013.01); *G01G 23/36* (2013.01); *A61G 2203/44* (2013.01)

(58) Field of Classification Search
CPC ...... A61G 1/04; A61G 2203/44; G01G 23/36; G01G 19/445; G01G 19/52; G01G 3/12
USPC ........................................................ 177/136
See application file for complete search history.

(56) References Cited

U.S. PATENT DOCUMENTS

| | | | |
|---|---|---|---|
| 4,827,763 A * | 5/1989 | Bourland | A61B 5/113 361/283.1 |
| 5,393,935 A | 2/1995 | Hasty | |
| 5,393,938 A | 2/1995 | Bumbalough | |
| 7,199,311 B1 * | 4/2007 | Buckner, Jr. | A61G 1/04 177/144 |
| 8,672,842 B2 * | 3/2014 | Kenalty | A47C 27/002 600/300 |
| 9,754,476 B2 | 9/2017 | Lemire | |
| 2005/0011681 A1 | 1/2005 | Follonier | |
| 2005/0190068 A1 * | 9/2005 | Gentry | G08B 21/0461 340/665 |
| 2012/0053424 A1 * | 3/2012 | Kenalty | G01L 19/0092 600/300 |
| 2014/0353049 A1 * | 12/2014 | Vidal | G06F 19/326 177/25.13 |
| 2017/0092103 A1 * | 3/2017 | Williams | A61B 5/6892 |

FOREIGN PATENT DOCUMENTS

CN 102631197 * 8/2012 ............. A61B 5/103

* cited by examiner

*Primary Examiner* — Jacques M Saint Surin

(57) ABSTRACT

A weight sensing pad assembly includes a pad that is comprised of a resiliently compressible material. The pad is positionable beneath a mattress of an ambulance gurney. In this way the pad is exposed to the weight of a patient lying on the ambulance gurney. An electronic scale is integrated into the pad to sense the weight of the patient when the patient lies on the ambulance gurney. The electronic scale displays weight indicia comprising numbers communicating the weight of the patient in kilograms. In this way the electronic scale facilitates emergency responders to accurately determine medication dosages that are based on the patient's weight.

8 Claims, 4 Drawing Sheets

WEIGHT SENSING PAD ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to scale devices and more particularly pertains to a new scale device for determining the weight of a patient on an ambulance gurney.

(2) Description of Related Art Including Information Disclosed Under 37 CFR 1.97 and 1.98

The prior art relates to scale devices.

BRIEF SUMMARY OF THE INVENTION

An embodiment of the disclosure meets the needs presented above by generally comprising a pad that is comprised of a resiliently compressible material. The pad is positionable beneath a mattress of an ambulance gurney. In this way the pad is exposed to the weight of a patient lying on the ambulance gurney. An electronic scale is integrated into the pad to sense the weight of the patient when the patient lies on the ambulance gurney. The electronic scale displays weight indicia comprising numbers communicating the weight of the patient in kilograms. In this way the electronic scale facilitates emergency responders to accurately determine medication dosages that are based on the patient's weight.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
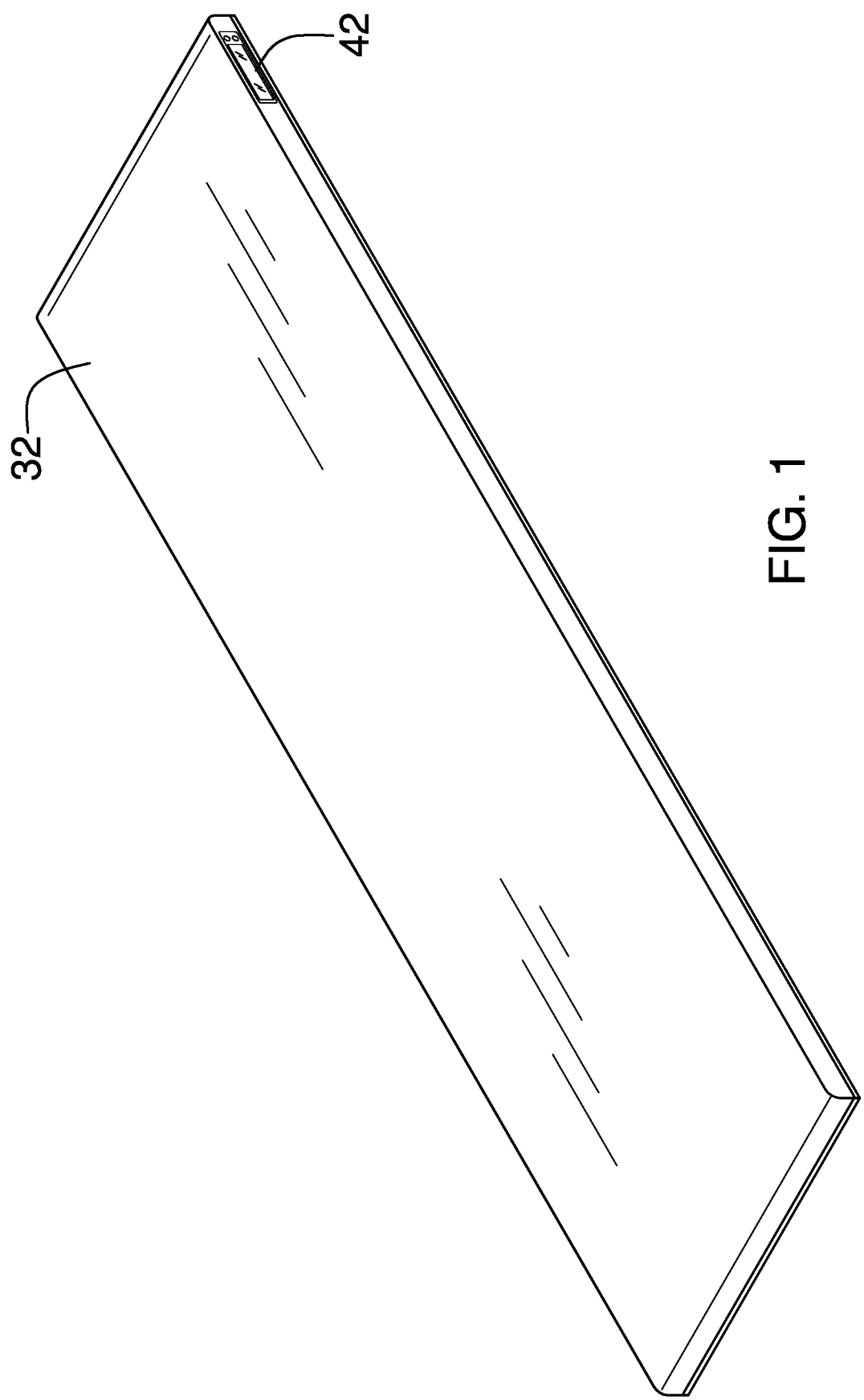
FIG. 1 is a top perspective view of a weight sensing pad assembly according to an embodiment of the disclosure.
Figure 2:
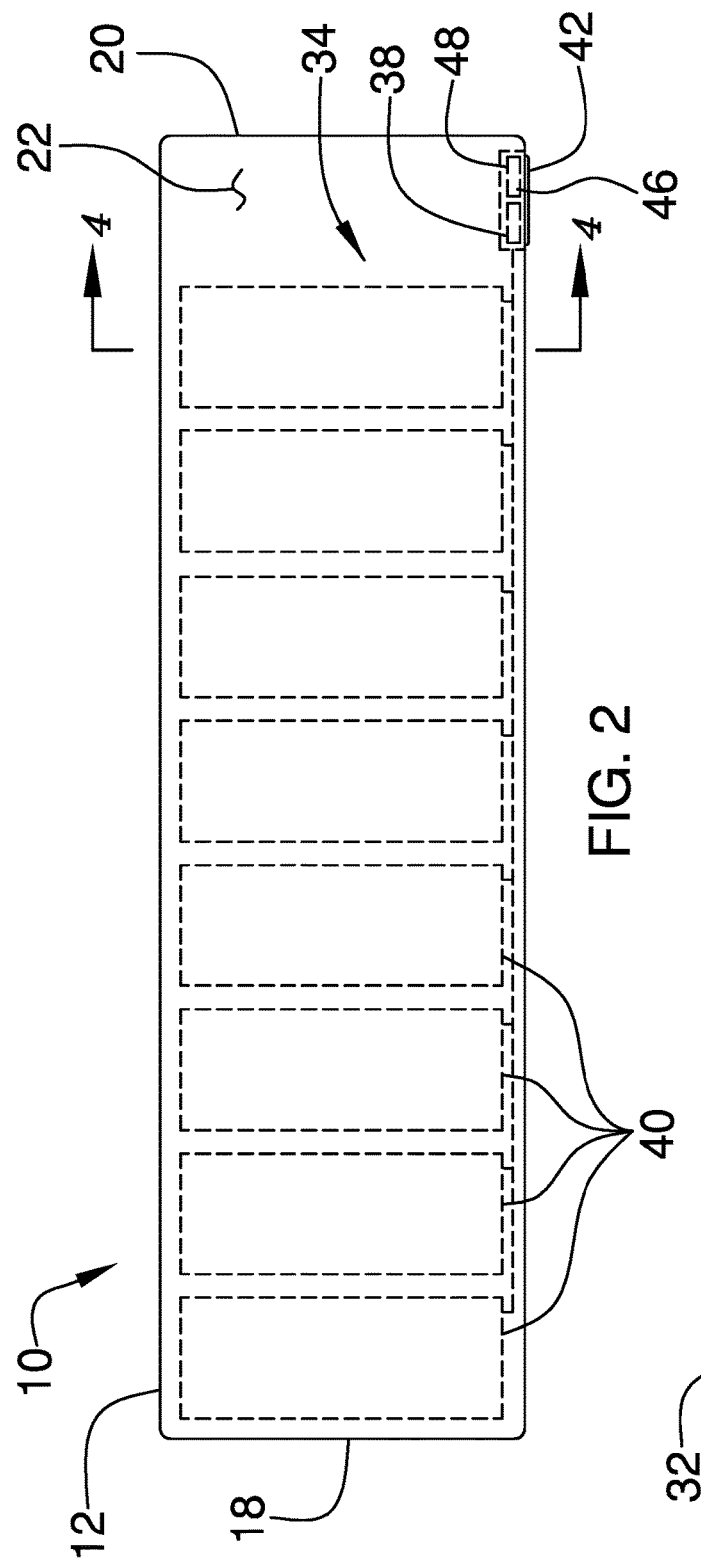
FIG. 2 is a top phantom view of a pad of an embodiment of the disclosure.
Figure 3:
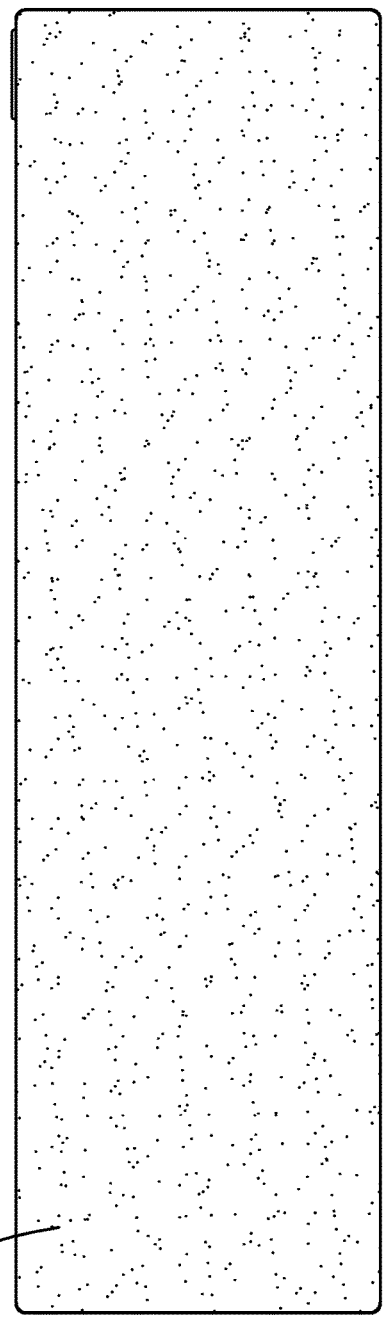
FIG. 3 is a bottom view of a cover of an embodiment of the disclosure.
Figure 4:
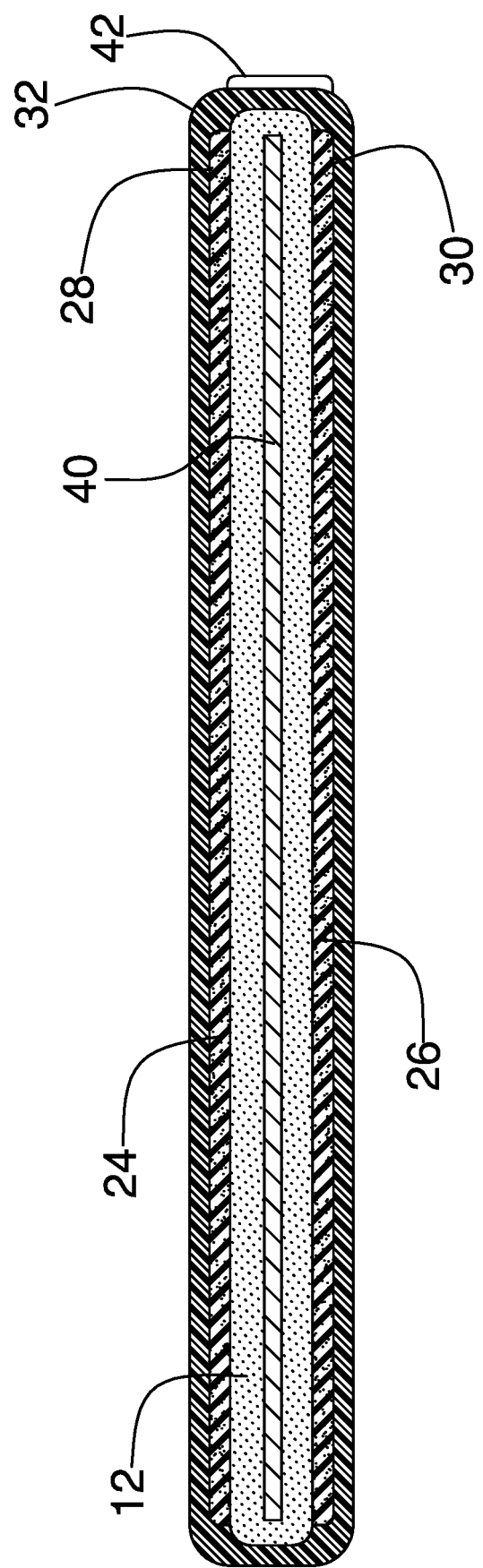
FIG. 4 is a cross sectional view taken along line 4-4 of FIG. 2 of an embodiment of the disclosure.
Figure 5:
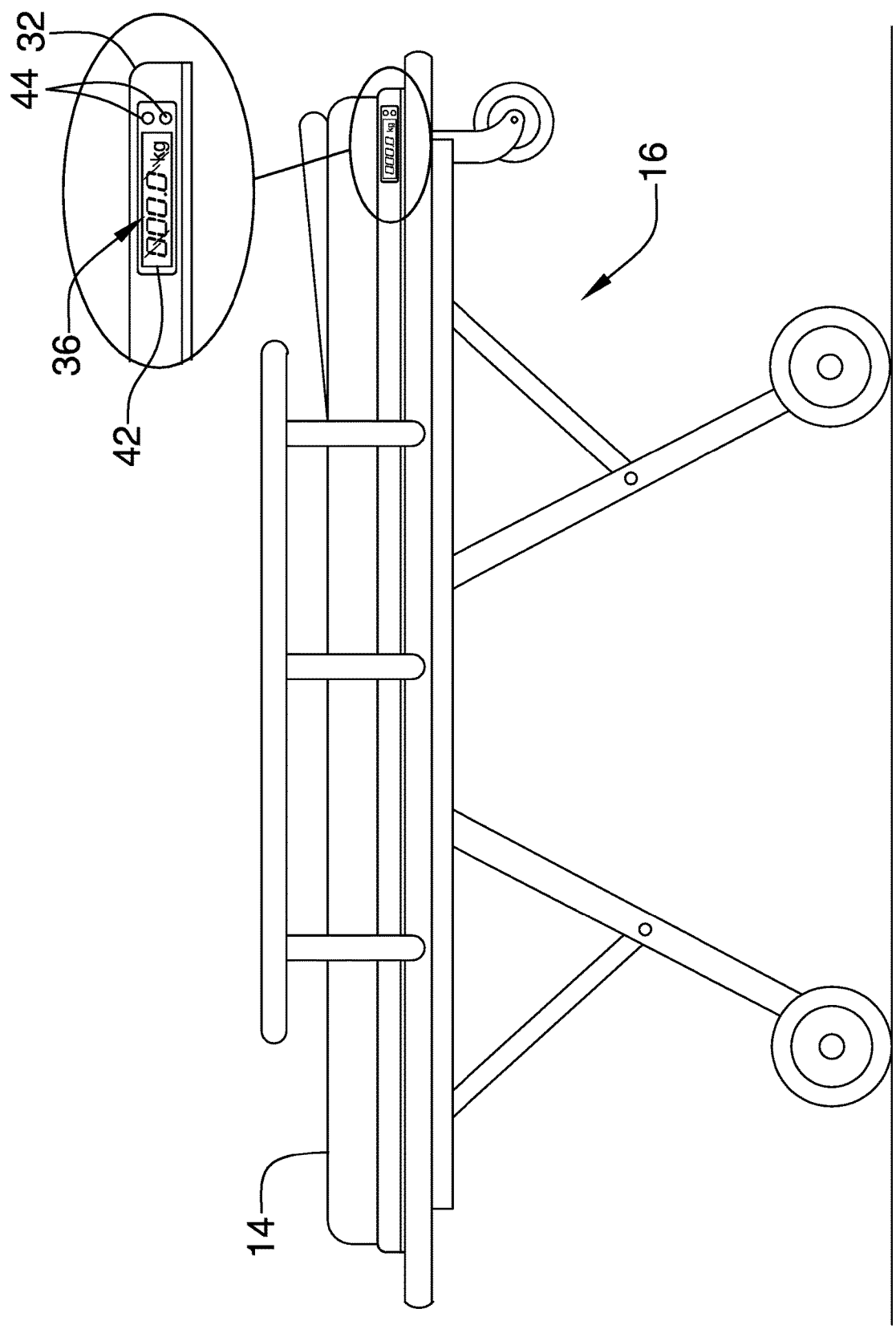
FIG. 5 is a perspective in-use view of an embodiment of the disclosure.

With reference now to the drawings, and in particular to FIGS. 1 through 5 thereof, a new scale device embodying the principles and concepts of an embodiment of the disclosure and generally designated by the reference numeral 10 will be described.

As best illustrated in FIGS. 1 through 5, the weight sensing pad assembly 10 generally comprises a pad 12 that is comprised of a resiliently compressible material, including but not being limited to, minicell foam, memory foam or other type of similar material. The pad 12 is positionable beneath a mattress 14 of an ambulance gurney 16. In this way the pad 12 is exposed to the weight of a patient that is transported on the ambulance gurney 16. The pad 12 has a first end 18, a second end 20 and an outer surface 22 extending therebetween. The pad 12 is elongated between the first end 18 and the second end 20, and the outer surface 22 has a top side 24 and a bottom side 26. The pad 12 may have a length of approximately 6.0 feet, a width of approximately 1.5 feet and a thickness of approximately 2.0 inches.

A top panel 28 is provided and the top panel 28 is positioned on the pad 12. The top panel 28 is comprised of a rigid material, such as plastic or the like, to evenly distribute the weight of the patient on the pad 12. The top panel 28 is positioned on the top side 24 of the outer surface 22 of the pad 12 and the top panel 28 is coextensive with the top side 24 of the outer surface 22. A bottom panel 30 is provided and the bottom panel 30 is positioned on the pad 12. The bottom panel 30 is comprised of a rigid material, such as plastic or the like, and the bottom panel 30 is positioned on the bottom side 26 of the outer surface 22 of the pad 12. Moreover, the bottom panel 30 is coextensive with the bottom side 26 of the outer surface 22. Each of the top panel 28 and the bottom panel 30 may have a thickness of approximately 2.0 mm.

A cover 32 is provided and the cover 32 encases the top panel 28, the pad 12 and the bottom panel 30. The cover 32 is comprised of a fluid impermeable material, such as polyvinylchloride or the like, to inhibit the pad 12 from being exposed to moisture.

An electronic scale 34 is provided and the electronic scale 34 is integrated into the pad 12. In this way the electronic scale 34 can sense the weight of the patient when the patient lies on the ambulance gurney 16. The electronic scale 34 displays weight indicia 36 comprising numbers for communicating the weight of the patient in kilograms. In this way the electronic scale 34 facilitates emergency responders to accurately determine medication dosages that are based on the patient's weight.

The electronic scale 34 comprises a control circuit 38 that is coupled to the pad 12. The electronic scale 34 includes a plurality of pressure sensors 40 that is each embedded into the pad 12. In this way each of the pressure sensors 40 can sense the weight of the patient. Each of the pressure sensors 40 is positioned between the top side 24 and the bottom side 26 of the outer surface 22 of the pad 12. Moreover, the pressure sensors 40 are distributed between the first end 18 and the second end 20 of the pad 12. In this way the plurality of pressure sensors 40 can determine the total weight of the patient when the patient is in a prone position. Each of the pressure sensors 40 is electrically coupled to the control circuit 38 and each of the pressure sensors 40 may comprise electronic weight sensors or the like.

The electronic scale 34 includes a display 42 that is coupled to the cover 32 such that the display 42 is exposed for viewing by the emergency responders. The display 42 is electrically coupled to the control circuit 38 and the display 42 displays the weight indicia 36 to communicate the weight of the patient. The display 42 may be an LCD or other type of electronic display 42. A plurality of control buttons 44 is each positioned on the display 42 and each of the control buttons 44 is electrically coupled to the control circuit 38. Each of the control buttons 44 controls operational parameters of the display 42 and the control circuit 38, including but not being limited to, power on, power off and resetting the display 42. A power supply 46 is coupled to the display 42, the power supply 46 is electrically coupled to the control circuit 38 and the power supply 46 comprises at least one battery 48.

In use, the pad 12 is positioned beneath the mattress 14 on the ambulance gurney 16. In this way the electronic scale 34 can measure the weight of the patient when the patient lies on the ambulance gurney 16. Additionally, the electronic scale 34 displays the weight of the patient in kilograms. Thus, emergency responders can accurately determine medication dosages that are dependent on the weight of the patient. In this way the emergency responders can accurately determine the patient's weight when the patient is unconscious or does not know their current weight.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A weight sensing pad assembly being configured to be positioned beneath a mattress of an ambulance gurney thereby facilitating the weight of a patient to be determined, said assembly comprising:

a pad being comprised of a resiliently compressible material, said pad being positionable beneath a mattress of an ambulance gurney wherein said pad is configured to be exposed to the weight of a patient being transported on the ambulance gurney;

a top panel being positioned on said pad, said top panel being comprised of a rigid material wherein said top panel is configured to evenly distribute the weight of the patient on said pad;

a bottom panel being positioned on said pad, said bottom panel being comprised of a rigid material;

a cover encasing said top panel, said pad and said bottom panel, said cover being comprised of a fluid impermeable material to inhibit said pad from being exposed to moisture;

an electronic scale being integrated into said pad wherein said electronic scale is configured to sense the weight of the patient when the patient lies on the ambulance gurney, said electronic scale displaying weight indicia comprising numbers communicating the weight of the patient in kilograms wherein said electronic scale is configured to facilitate emergency responders to accurately determine medication dosages that are based on the patient's weight;

said pad having a first end, a second end and an outer surface extending therebetween, said pad being elongated between said first end and said second end, said outer surface having a top side and a bottom side;

said top panel being positioned on said top side of said outer surface of said pad, said top panel being coextensive with said top side of said outer surface; and said bottom panel being positioned on said bottom side of said outer surface of said pad, said bottom panel being coextensive with said bottom side of said outer surface.

2. The assembly according to claim 1, wherein said electronic scale comprises:

a control circuit being coupled to said pad; and a plurality of pressure sensors, each of said pressure sensors being embedded into said pad wherein each of said pressure sensors is configured to sense the weight of the patient, each of said pressure sensors being positioned between said top side and said bottom side of said outer surface of said pad.

3. The assembly according to claim 2, wherein said pressure sensors are distributed between said first end and said second end of said pad wherein said plurality of pressure sensors is configured to determine the total weight of the patient when the patient is in a prone position, each of said pressure sensors being electrically coupled to said control circuit.

4. The assembly according to claim 2, wherein said electronic scale includes a display being coupled to said cover such that said display is exposed for viewing by the emergency responders, said display being electrically coupled to said control circuit, said display displaying said weight indicia to communicate the weight of the patient.

5. The assembly according to claim 4, wherein said electronic display includes a plurality of control buttons, each of said control buttons being positioned on said display, each of said control buttons being electrically coupled to said control circuit, each of said control buttons controlling operational parameters of said display and said control circuit, including power on, power off and resetting said display.

6. The assembly according to claim 2, further comprising a power supply being coupled to said pad, said power supply being electrically coupled to said control circuit, said power supply comprising at least one battery.

7. A weight sensing pad assembly being configured to be positioned beneath a mattress of an ambulance gurney thereby facilitating the weight of a patient to be determined, said assembly comprising:
- a pad being comprised of a resiliently compressible material, said pad being positionable beneath a mattress of an ambulance gurney wherein said pad is configured to be exposed to the weight of a patient being transported on the ambulance gurney, said pad having a first end, a second end and an outer surface extending therebetween, said pad being elongated between said first end and said second end, said outer surface having a top side and a bottom side;
- a top panel being positioned on said pad, said top panel being comprised of a rigid material wherein said top panel is configured to evenly distribute the weight of the patient on said pad, said top panel being positioned on said top side of said outer surface of said pad, said top panel being coextensive with said top side of said outer surface;
- a bottom panel being positioned on said pad, said bottom panel being comprised of a rigid material, said bottom panel being positioned on said bottom side of said outer surface of said pad, said bottom panel being coextensive with said bottom side of said outer surface;
- a cover encasing said top panel, said pad and said bottom panel, said cover being comprised of a fluid impermeable material to inhibit said pad from being exposed to moisture; and
- an electronic scale being integrated into said pad wherein said electronic scale is configured to sense the weight of the patient when the patient lies on the ambulance gurney, said electronic scale displaying weight indicia comprising numbers communicating the weight of the patient in kilograms wherein said electronic scale is configured to facilitate emergency responders to accurately determine medication dosages that are based on the patient's weight, said electronic scale comprising:
  - a control circuit being coupled to said pad;
  - a plurality of pressure sensors, each of said pressure sensors being embedded into said pad wherein each of said pressure sensors is configured to sense the weight of the patient, each of said pressure sensors being positioned between said top side and said bottom side of said outer surface of said pad, said pressure sensors being distributed between said first end and said second end of said pad wherein said plurality of pressure sensors is configured to determine the total weight of the patient when the patient is in a prone position, each of said pressure sensors being electrically coupled to said control circuit;
  - a display being coupled to said cover such that said display is exposed for viewing by the emergency responders, said display being electrically coupled to said control circuit, said display displaying said weight indicia to communicate the weight of the patient;
  - a plurality of control buttons, each of said control buttons being positioned on said display, each of said control buttons being electrically coupled to said control circuit, each of said control buttons controlling operational parameters of said display and said control circuit, including power on, power off and resetting said display; and
- a power supply being coupled to said pad, said power supply being electrically coupled to said control circuit, said power supply comprising at least one battery.

8. A weight sensing pad system comprising:
an ambulance gurney including a mattress;
- a pad being comprised of a resiliently compressible material, said pad being positionable beneath said mattress of said ambulance gurney wherein said pad is configured to be exposed to the weight of a patient being transported on said ambulance gurney, said pad having a first end, a second end and an outer surface extending therebetween, said pad being elongated between said first end and said second end, said outer surface having a top side and a bottom side;
- a top panel being positioned on said pad, said top panel being comprised of a rigid material wherein said top panel is configured to evenly distribute the weight of the patient on said pad, said top panel being positioned on said top side of said outer surface of said pad, said top panel being coextensive with said top side of said outer surface;
- a bottom panel being positioned on said pad, said bottom panel being comprised of a rigid material, said bottom panel being positioned on said bottom side of said outer surface of said pad, said bottom panel being coextensive with said bottom side of said outer surface;
- a cover encasing said top panel, said pad and said bottom panel, said cover being comprised of a fluid impermeable material to inhibit said pad from being exposed to moisture; and
- an electronic scale being integrated into said pad wherein said electronic scale is configured to sense the weight of the patient when the patient lies on said ambulance gurney, said electronic scale displaying weight indicia comprising numbers communicating the weight of the patient in kilograms wherein said electronic scale is configured to facilitate emergency responders to accurately determine medication dosages that are based on the patient's weight, said electronic scale comprising:
  - a control circuit being coupled to said pad;
  - a plurality of pressure sensors, each of said pressure sensors being embedded into said pad wherein each of said pressure sensors is configured to sense the weight of the patient, each of said pressure sensors being positioned between said top side and said bottom side of said outer surface of said pad, said pressure sensors being distributed between said first end and said second end of said pad wherein said plurality of pressure sensors is configured to determine the total weight of the patient when the patient is in a prone position, each of said pressure sensors being electrically coupled to said control circuit;
  - a display being coupled to said cover such that said display is exposed for viewing by the emergency responders, said display being electrically coupled to said control circuit, said display displaying said weight indicia to communicate the weight of the patient;

a plurality of control buttons, each of said control buttons being positioned on said display, each of said control buttons being electrically coupled to said control circuit, each of said control buttons controlling operational parameters of said display and said control circuit, including power on, power off and resetting said display; and a power supply being coupled to said pad, said power supply being electrically coupled to said control circuit, said power supply comprising at least one battery.

* * * * *